United States Patent [19]

Gaschler

[11] 3,918,258
[45] Nov. 11, 1975

[54] EXHAUST GAS REACTOR FOR A COMBUSTION ENGINE

[75] Inventor: Erich Gaschler, Wolfsburg, Germany

[73] Assignee: Volkswagenwerk Aktiengesellschaft, Wolfsburg, Germany

[22] Filed: June 13, 1974

[21] Appl. No.: 479,250

Related U.S. Application Data

[63] Continuation of Ser. No. 281,105, Aug. 16, 1972, abandoned.

[30] Foreign Application Priority Data

Sept. 1, 1971 Germany.............................. 2143731

[52] U.S. Cl. ...................... 60/305; 60/282; 60/901; 123/8.45
[51] Int. Cl.² ........................................ F01N 3/10
[58] Field of Search ............ 123/8.45; 60/901, 282, 60/303, 304, 305, 323, 298

[56] References Cited
UNITED STATES PATENTS

| | | | |
|---|---|---|---|
| 1,793,813 | 2/1931 | MacKinnon | 60/302 |
| 3,059,421 | 10/1962 | Schnabel | 60/303 |
| 3,633,368 | 1/1972 | Rosenlund | 60/282 |
| 3,704,592 | 12/1972 | Panhard | 60/298 |

FOREIGN PATENTS OR APPLICATIONS

| | | | |
|---|---|---|---|
| 413,967 | 7/1934 | United Kingdom | 60/298 |
| 1,425,656 | 12/1965 | France | 123/8.45 |

*Primary Examiner*—Douglas Hart
*Attorney, Agent, or Firm*—Ernest F. Marmorek

[57] ABSTRACT

A combustion engine of the rotary piston type in combination with an exhaust gas reactor, the combustion engine having an exhaust gas output channel with a secondary air input thereto for mixing the exhaust gas with secondary air for improved burning thereof in the exhaust gas reactor, a side plate on the combustion engine mounted at the exhaust gas emission side thereof, the exhaust gas reactor being mounted on the side plate forms a unit therewith and communicates with the exhaust opening of the combustion engine.

9 Claims, 3 Drawing Figures

EXHAUST GAS REACTOR FOR A COMBUSTION ENGINE

This is a continuation of application Ser. No. 281,105, filed Aug. 16, 1972, now abandoned.

FIELD OF THE INVENTION

The present invention relates to an exhaust gas reactor for a combustion engine, especially for a rotary piston type combustion engine with an exhaust gas reactor coupled to an outlet channel into which there is also coupled an input for a secondary air.

BACKGROUND OF THE INVENTION

Since air pollution reached a very high degree, it is imperative that the combustion engines be provided with exhaust gas reactors in order to reduce the polluting components in the exhaust gas. This is not only necessary for conventional combustion engines having pistons of the vertical displacement type; it is also a necessary requirement for combustion engines having rotary type pistons.

The basic requirement of the exhaust gas reactor is the completion of the burning of the exhaust gas in a thermal fashion. To this effect it is necessary that:

1. The exhaust gas is well mixed with a secondary air;
2. A sufficiently long reaction path is provided;
3. A high temperature level is present; and
4. The flame is well kept up.

From the SAE paper 700074 entitled "Reduction of Emissions from the Curtiss-Wright Rotating Combustion Engine With an Exhaust Reactor" and published at the Automotive Engineering Congress in Detroit, held in January, 1970, there became known a combustion engine having an exhaust gas reactor which is coupled by means of tube-like flanges to the exhaust opening or on the tail pipe of the engine. The reaction paths are not exactly fixed so that disturbing turbulences can occur in such arrangement. In order to attain in such proposed device a high temperature level, there is suggested a very expensive insulation as a large surface of the device is exposed to the cooling of the outer atmosphere.

SUMMARY OF THE INVENTION

It is, therefore, an object of the present invention to provide an improved and novel exhaust gas reactor for a combustion engine having a rotary-type piston arrangement therein which eliminates the difficulties and shortcomings of known or proposed devices of similar art.

According to the present invention the exhaust gas reactor is directly arranged on a side disc of the combustion engine at its exhaust gas side and forms a unitary structure therewith inclusive the exhaust gas openings.

According to a further embodiment of the present invention the exhaust gas reactor is shaped annularly and is subdivided into a pair of annular chambers. The first annular chamber is in connection with the exhaust opening of the combustion engine while the second annular chamber is provided with at least one exhaust gas outlet opening; both said annular chambers are coupled and communicate with each other at their end portions lying opposite to the exhaust gas outlet opening.

In order to attain an improved mixing of the secondary air with the exhaust gas which is to be burned and, in order that the flame or in other words, the combustion of the exhaust gases could be kept up well, in one of the annular chambers or in both of the annular chambers turbulence plates having apertures therethrough are provided running in a radial fashion within the annular chamber or chambers.

According to a further aspect of the present invention, a turbulence plate is provided between each pair of exhaust gas inlet openings. The outer walls of the exhaust gas reactor are provided with a thermal insulation. The portion of the exhaust gas reactor which must be provided with a heat insulator is relatively small considering the fact that the exhaust gas reactor has been integrated with the combustion engine which is in obvious contrast with respect to the known and proposed devices.

The technical progress achieved by the invention resides also in that by having a good mixing of the exhaust gas with the secondary air, there will be obtained a good upkeep of the flame and a long reaction path is created at a high temperature level. The above, especially the long reaction path, is attained by the advantageous guiding of the exhaust gas according to the present invention, namely, by providing inlet openings parallel to the annular chambers, forcibly guiding the exhaust gases in a circular path while they are mixed with the added secondary air by means of the turbulence plates, and by providing an outlet at an end portion lying opposite to the communication of the two annular chambers and, at the same time, providing a good heat insulation.

BRIEF DESCRIPTION OF THE DRAWINGS

The invention will become more readily apparent from the following description of preferred embodiments thereof shown in the accompanying drawings, in which:

FIG. 3 is not taken along the section line II—II of FIG. 1, as FIG. 3 is a distinct embodiment over that of FIG. 1.

DESCRIPTION OF THE PREFERRED EMBODIMENTS

Figure 1:
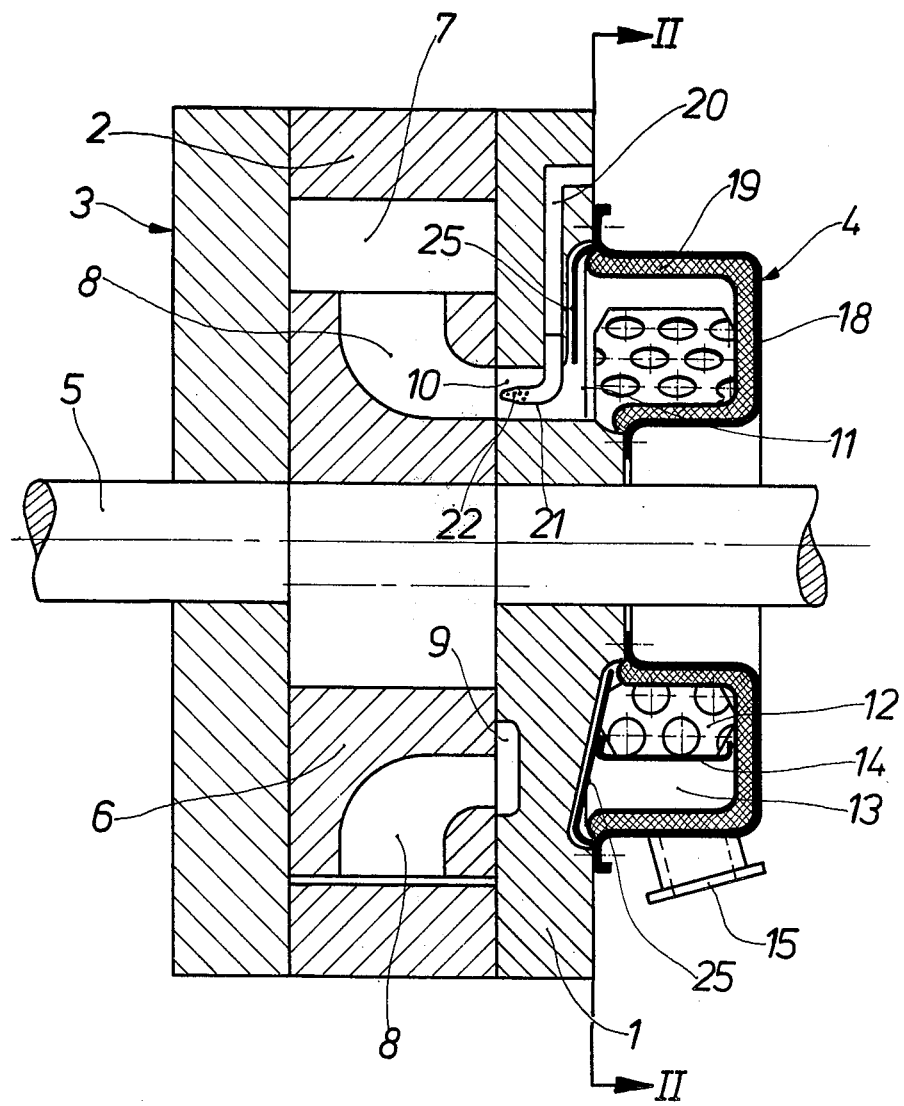
FIG. 1 is a sectional view through a combustion engine having a rotary type piston with a coupled exhaust gas reactor according to the present invention.

For the purpose of illustration, a combustion engine having a rotary-type piston arrangement therein has been selected. To a side disc 1 of the housing 2 of a combustion engine 3 of a rotary type piston, a circularly shaped exhaust gas reactor 4 is mounted. Within the housing 2 of the combustion engine 3 of the rotary type piston, a piston 6 rotates about an excenter shaft 5 and forms combustion spaces 7. The exhaust gases are led away from the combustion spaces 7,-such as described in the copending application of Helmut Leption, Peter Hofbauer and Gustav Vogelsang, filed on July 14, 1972 and assigned to the assignee of the instant application - through exhaust gas passages 8 formed within the piston 6 and are led into a collecting annular space 9 formed in the side disc or plate 1 from where they reach into an outlet passage 10 having outlet openings 11 and then reach an annular chamber 12. This annular chamber 12 is separated from a second surrounding annular chamber 13 by means of a gas-tight wall portion 14. In the second annular chamber 13 there is at least one exhaust gaas outlet opening 15 at the end portions 17 lying opposite to the communication region 16 of both annular chambers 12 and 13; said region 16 serves as a turnaround for gases coming from chamber 12 and going into chamber 13. In the embodiment shown in FIG. 2 and additional turbulence plate 27 is provided in the region 16.

Figure 2:
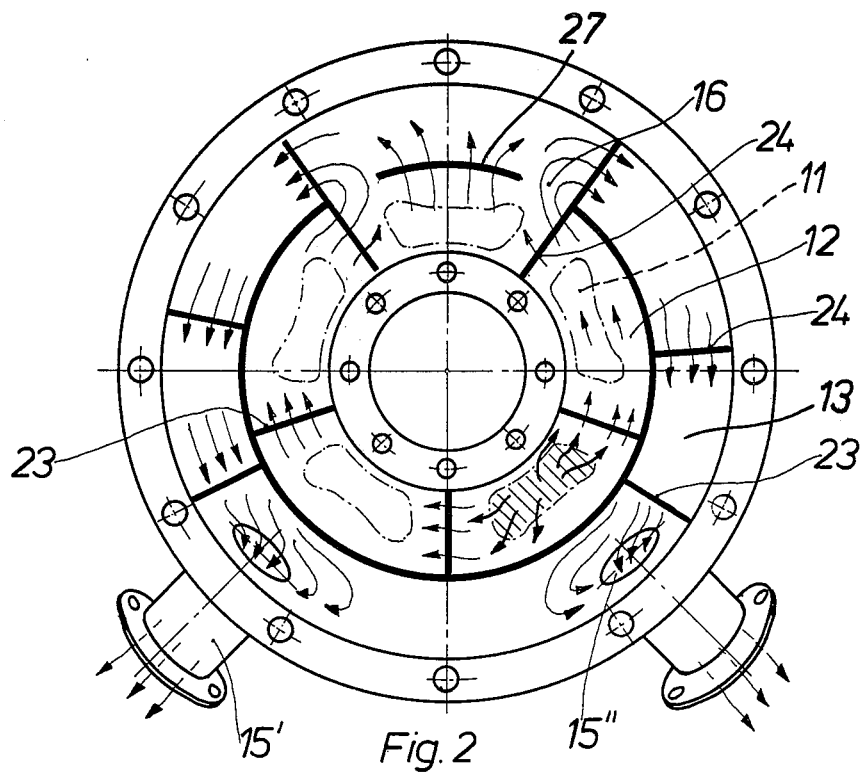
FIG. 2 is a further sectional view along the line II—II in FIG. 1.
Figure 3:
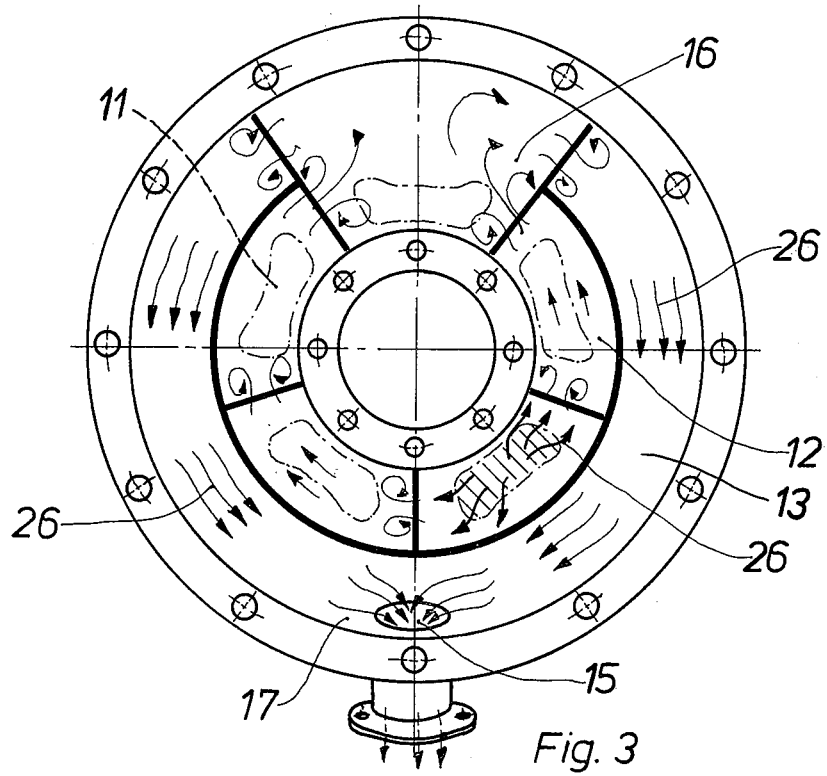
FIG. 3 is another embodiment of the present invention similar in view to the cross sectional showing of FIG. 2; however.

As seen in FIG. 2, there may be provided a pair of exhaust gas openings 15' and 15''. The housing 18 of the exhaust gas reactor 4 is provided on all its sides with an insulating cover 19. The secondary air for aiding the combustion of the exhaust gases in the reactor is fed through a conduit 20 which at its end 21 tapers conically and has openings 22 opening into the outlet channel 10. The exhaust gas together with the secondary air which is dosed thereto, flows through the outlet openings 11 into the annular chamber 12 and there with the help of the turbulence plates 23 which are provided with apertures 24, is mixed with the exhaust gas. The particular arrangement of the turbulence plates 23, 24 within the annular chamber 12 and in the annular chamber 13 can be clearly seen in the drawing to satisfy the requirements as pointed out in the broad description of the invention, that is, to cause behind each plate a turbulence and thereby a good mixture of the gas, as shown by the arrows 26. The number of the turbulence plates 23 can vary and is always selected to satisfy certain particular requirements within which the combustion engine operates. For the protection of the side portion 1 protecting plates 25 are provided on the reactor.

The flow direction of the exhaust gas, as well as the mixture thereof with the secondary air, is illustrated by the arrows 26. A study of the direction of the arrows shows that the exhaust gas and its secondary air mixture is undergoing a forcible guiding and thereby will have a long reaction path as well as a good mixture of the exhaust gas with the secondary air.

It is noted for clarity of the operation of the exhaust gas reactor of the present invention that the flow of the exhaust gas from the inlet openings 11 through chambers 12 and 13 is determined by the pressure difference between the inlets 11 and the outlets 15. The turbulence plates 23 serve for good mixing of the exhaust gas components.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A combustion engine of the rotary piston type in combination with an exhaust gas reactor, having a longitudinal axis, the combustion engine comprising an exhaust gas outlet channel having a secondary air inlet thereto for mixing the exhaust gas with secondary air for improved burning thereof in the exhaust gas reactor, a side plate means on said combustion engine mounted at the side of said exhaust gas outlet channel, said exhaust gas reactor comprising a casing having an annular shape formed about said axis and defining an open end surface substantially perpendicular to said axis, said exhaust gas reactor being mounted directly on said side plate means, said open end surface of the exhaust gas reactor casing lying against the side plate means and communicating with the exhaust outlet channel of said combustion engine.

2. The combination as claimed in claim 1, wherein said annular exhaust gas reactor casing comprises a pair of annular chambers, one of said annular chambers communicating with said exhaust gas outlet of said combustion engine to said reactor, the other of said annular chambers comprises at least one chamber exhaust gas outlet opening, means for communicating both of said annular chambers at their end regions lying opposite to said chamber exhaust gas outlet opening of said chamber.

3. The combination as claimed in claim 2, wherein in said one annular chamber turbulence plate means are provided directed radially with respect to said one annular chamber, said turbulence plate means having apertures provided therein for improving the mixing of said exhaust gas and said secondary air by creating turbulences of said gas.

4. The combination as claimed in claim 2, wherein in said other annular chamber turbulence plate means are provided directed radially with respect to said other annular chamber, said turbulence plate means having apertures provided therein for improving the mixing of said exhaust gas and said secondary air.

5. The combination as claimed in claim 2, wherein there is a plurality of exhaust gas outlets in said combustion engine.

6. The combination as claimed in claim 5, wherein a turbulence plate means is provided between adjacent exhaust gas inlet outlets.

7. The combination as claimed in claim 1, wherein said exhaust gas reactor comprises outer wall portions, said outer wall portions having a thermal insulation thereon.

8. The combination as claimed in claim 2, wherein said pair of annular chambers are concentric with each other, the inner one of said chambers communicating with said inlet openings.

9. The combination as claimed in claim 8, wherein said communicating means of said pair of concentric chambers is a region for turning about the gas flowing from said inner chamber to the outer one of said concentric chambers.

* * * * *